*Inventor*
Frederic E. Bertrand
By his Attorney

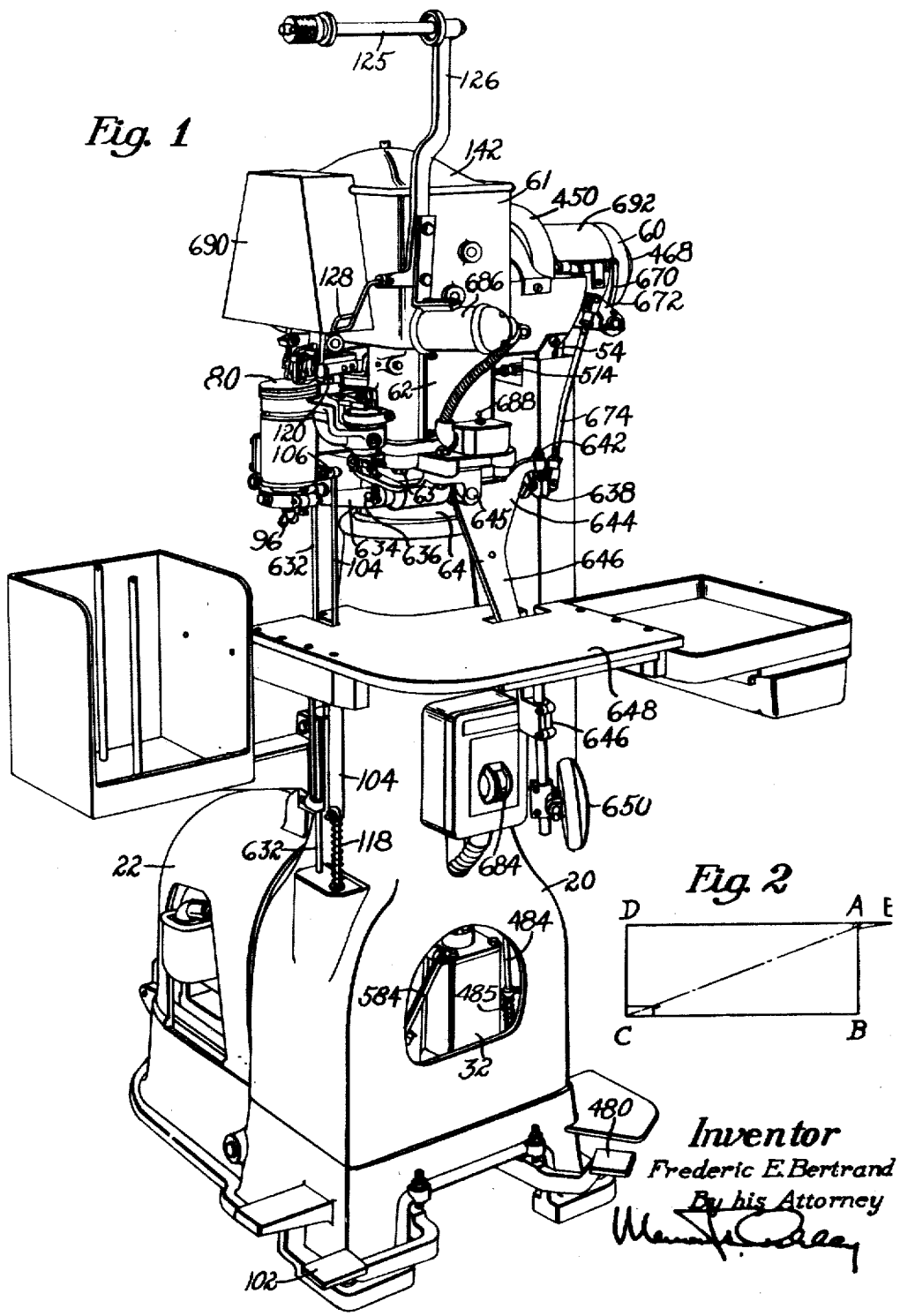

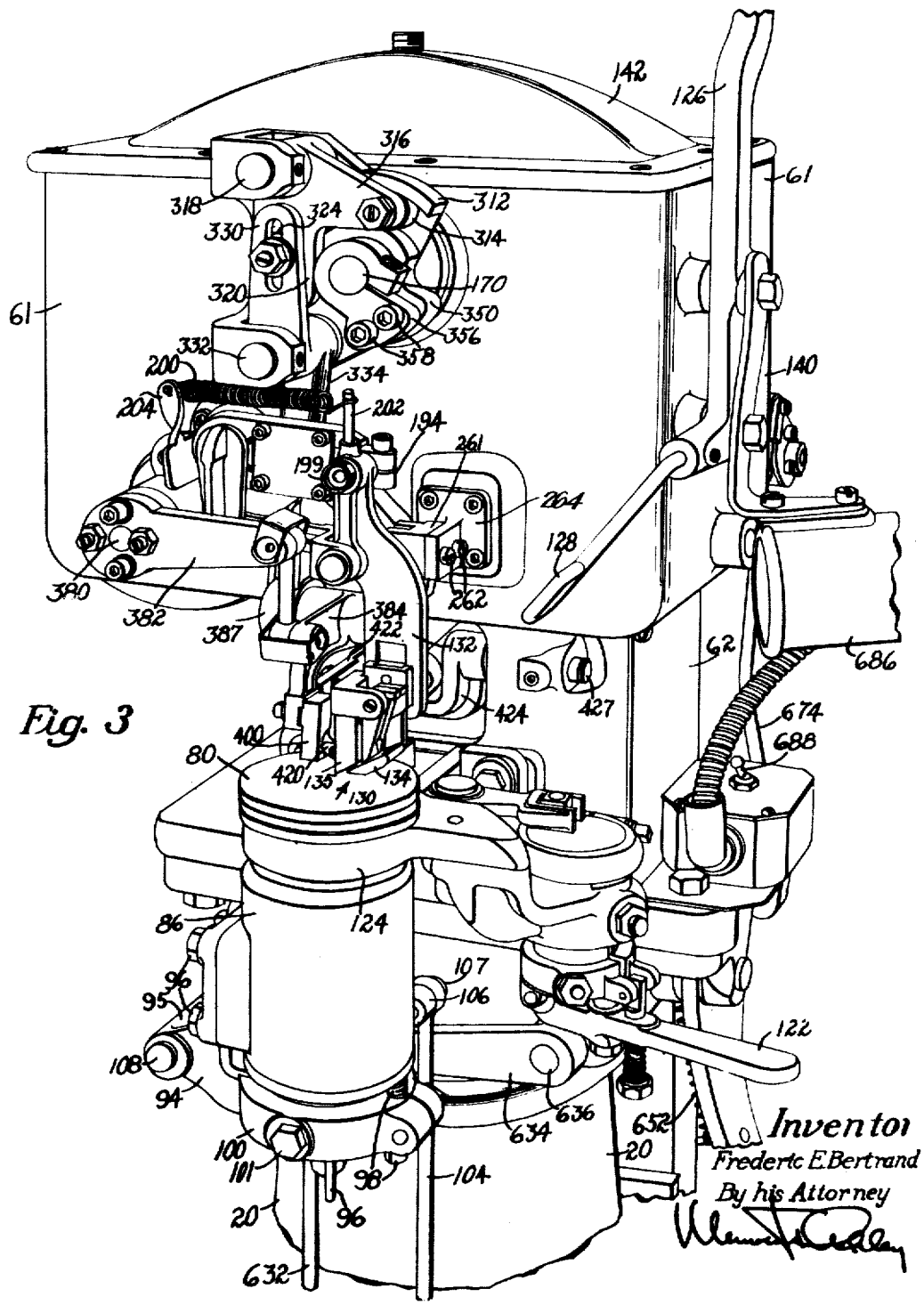

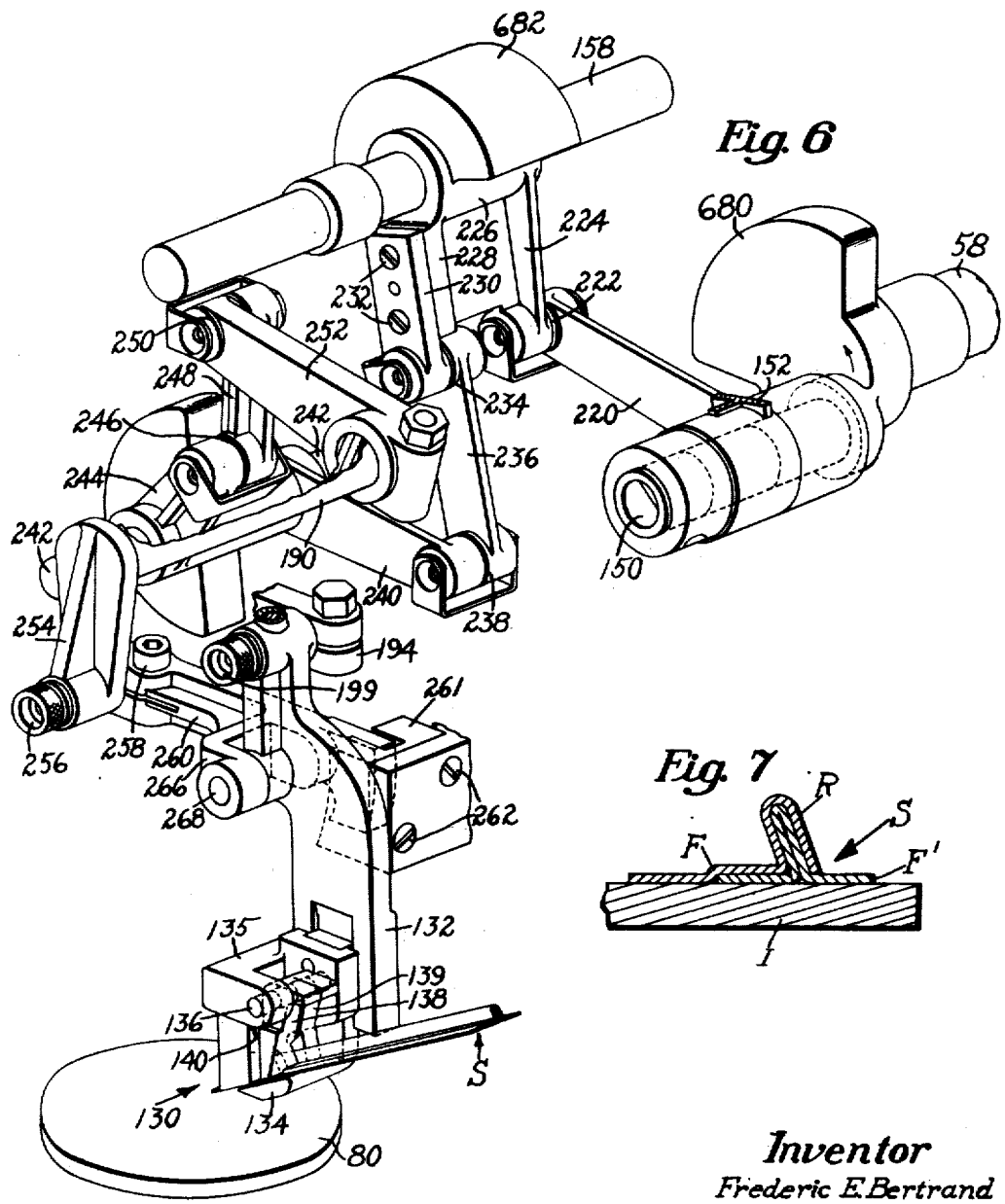

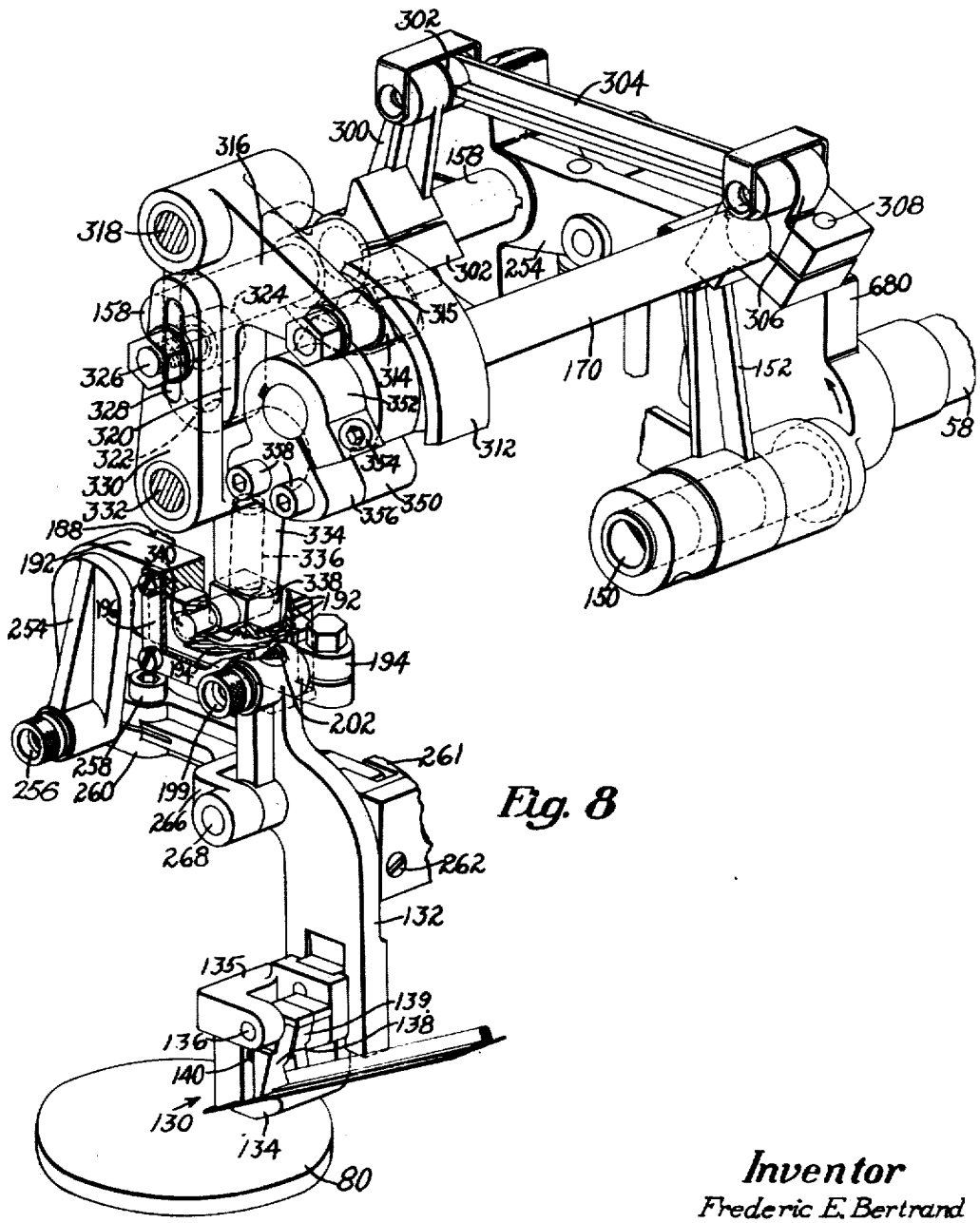

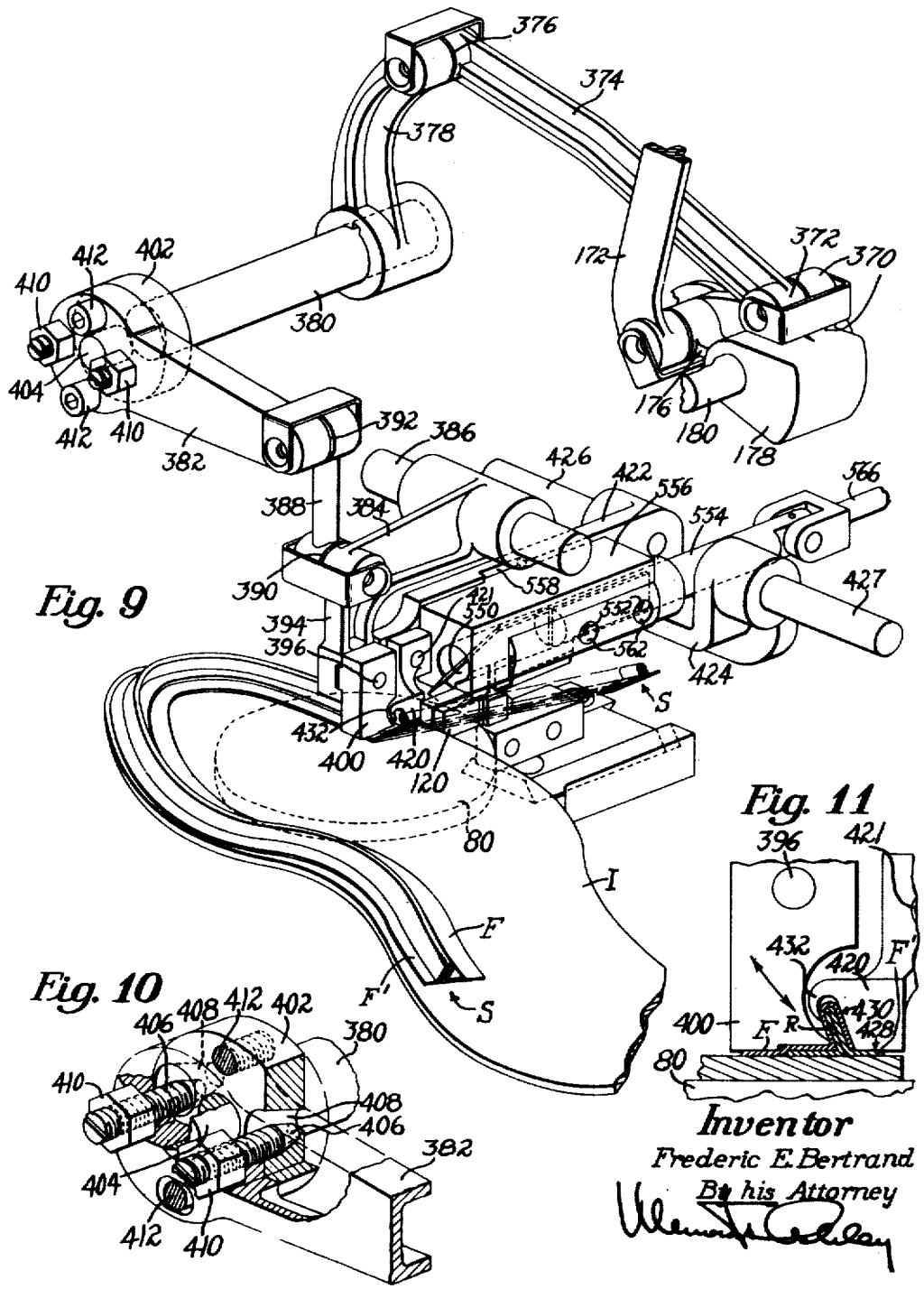

Patented Nov. 6, 1951

2,573,683

UNITED STATES PATENT OFFICE 2,573,683

MACHINE FOR USE IN MAKING INSOLES

Frederic E. Bertrand, Lynn, Mass., assignor to United Shoe Machinery Corporation, Flemington, N. J., a corporation of New Jersey Application November 6, 1947, Serial No. 784,344

34 Claims. (Cl. 12—20)

This invention relates to machines for operating on soles for shoes and is particularly adapted, as illustrated, for applying ribbed strips to insoles to form sewing ribs thereon.

Objects of the invention are to provide a novel, durable, high-speed machine for this purpose.

A further object of the invention is to provide a feed foot having a novel and more effective orbital path.

Many machines for work upon shoe parts have been provided with means for intermittently feeding the parts such as a four-motion feed foot, that is, a feed foot having an orbital movement during one part of which the foot engages the work, as disclosed for example in my prior Letters Patent of the United States No. 2,326,119, granted August 10, 1943.

A feature of the invention consists in means for operating a feed foot in an orbital path composed of straight lines which join each other at substantially right angles, the path being substantially rectangular.

As illustrated, horizontal and vertical movements are imparted to the feed foot from a single crank, the nearly vertical movements of the crank being utilized to impart vertical movements to the feed foot, and the nearly horizontal movements of the crank being utilized to impart horizontal movements to the foot. Of course the crank, during its nearly vertical movement, has some lateral or horizontal movement. These horizontal movements, however, are absorbed by operating a toggle while near its straightened position so that, when vertical movement of the crank is being utilized to move the feed foot, its attendant horizontal movement is nullified and the feed foot moves in a substantially vertical path. Likewise, when the horizontal movement of the crank is being used to move the feed foot, the attendant slight vertical movement is nullified by moving a toggle while near its straight position and the feed foot moves in a substantially horizontal path.

The rotation of the crank may be divided into four quadrants, the zero or starting point being at the end of a radius which is at 45 degrees to the vertical extending down and toward the right from the center about which the crank moves. The crank moves counterclockwise about its center, the 90-degree point being at the end of the radius extending up and to the right at 45 degrees to the vertical, and so on.

The movement of the crank is imparted to two mechanical systems, one comprising three toggles and an angle lever for imparting vertical or up-and-down movements to the feed foot, the other system comprising two toggles and two angle levers for imparting horizontal or to-and-fro movements to the feed foot. These may be referred to briefly as the vertical and horizontal systems. As the crank moves from zero to 90 degrees, its vertical movement is utilized to move the feed foot down by breaking one toggle and straightening the two others in the vertical system, the unwanted horizontal movement being absorbed by moving one of the toggles in the horizontal system while it is near its straightened position. As the crank moves from 90 degrees to 180 degrees, its horizontal movement is imparted to the feed foot by breaking one of the toggles of the horizontal system and straightening the other, the unwanted vertical movement being absorbed by slight movement of the straightened toggles of the vertical system.

As the crank moves from 180 degrees to 270 degrees, its vertical movement is utilized to move the feed foot up by straightening the first toggle in the vertical system and breaking the other two, the unwanted horizontal movement being absorbed by a slight movement of a straightened toggle in the horizontal system.

As the crank moves from 270 degrees back to zero, its horizontal movement is utilized to move the feed foot leftward, while raised, to its starting point by breaking the straight toggle and straightening the other one, the unwanted vertical movement being absorbed by a slight movement of the straight toggle in the vertical system.

As a further feature of the invention, novel means is provided for imparting a variable straight feed movement to the feed foot while it is raised so that the strip may be fed more than the insole is fed to avoid undue tension on the strip and prevent distortion of the insole due to application of the strip thereto while under too much tension.

To this end, one arm of the angle lever by which heightwise movement is imparted to the feed foot carries a slide which is connected to the feed foot and movement of which is under control of a cam. During the rightward movement of the feed foot while raised, that is, in the fourth quadrant of movement of the crank, the cam is operated to permit a movement of the slide which changes the length of the arm of the angle lever in a direction to effect further rightwise movement of the feed foot, the cam immediately moving the slide back to restore the arm to its initial length again.

The illustrated machine is provided with a depressible, yieldingly sustained, rotatable table on which the work is placed, an adjustable edge gage being provided for locating the work with respect to the strip-applying means. The feed foot is positively operated to engage the work, depress the table, feed the work in a straight line, and then rise abruptly. During the upward movement of the feed foot a tucking foot is depressed positively to press the inner flange of the ribbed strip against the insole, this tool having a component of movement outwardly of the insole to enter closely into the angle between the rib and the inner flange.

To engage the outer flange of the ribbed strip, a presser foot is provided which yields slightly heightwise as the table presses the work upwardly against the presser foot when the feed foot rises. This foot for pressing the outer flange of the strip is provided not only with a surface to engage the outer flange but also with a surface upwardly and inwardly inclined with respect to the insole for engaging the outer face of the rib, and is further provided with a hook to extend over the top of the rib to assist in guiding it through the machine.

After the strip has been applied to the insole, it has to be severed, preferably between the feed foot and the tucking foot, leaving enough of the strip under the front part of the feed foot to permit its initial attachment to the next insole. For this purpose, as a feature of the invention, a power-operated, operator-controlled knife is provided, the knife being movable transversely to sever the strip and having an upturned end portion for severing the rib portion of the strip. The knife is controlled by a knee lever which trips a clutch to cause operation of the knife. Means is provided for stopping the machine in that portion of its cycle where the feed foot and the tucking foot are separated to permit the passage of the knife between them.

These and other features of the invention will be explained more fully in connection with the accompanying drawings and will be pointed out in the appended claims.

In the drawings,

Fig. 1 is a perspective view of the entire machine;

Fig. 2 is a diagrammatic representation of the path of the feed foot;

Fig. 3 is a perspective view of the head of the machine;

Fig. 6 is a perspective view of the mechanism for imparting horizontal movements to the feed foot, called herein the horizontal system;

Fig. 7 is an enlarged cross-section of a strip which may be applied to insoles by the machine;

Fig. 8 is a perspective view of mechanism for imparting an extra feed movement to the feed foot while raised from the work;

Fig. 9 is a perspective view showing the mechanism for operating the tucker foot and the cut-off knife;

Fig. 10 is a detail in perspective, partly in section, of parts shown in Fig. 9;

Fig. 11 is an enlarged detail of parts shown in Fig. 9;

Figure 12:
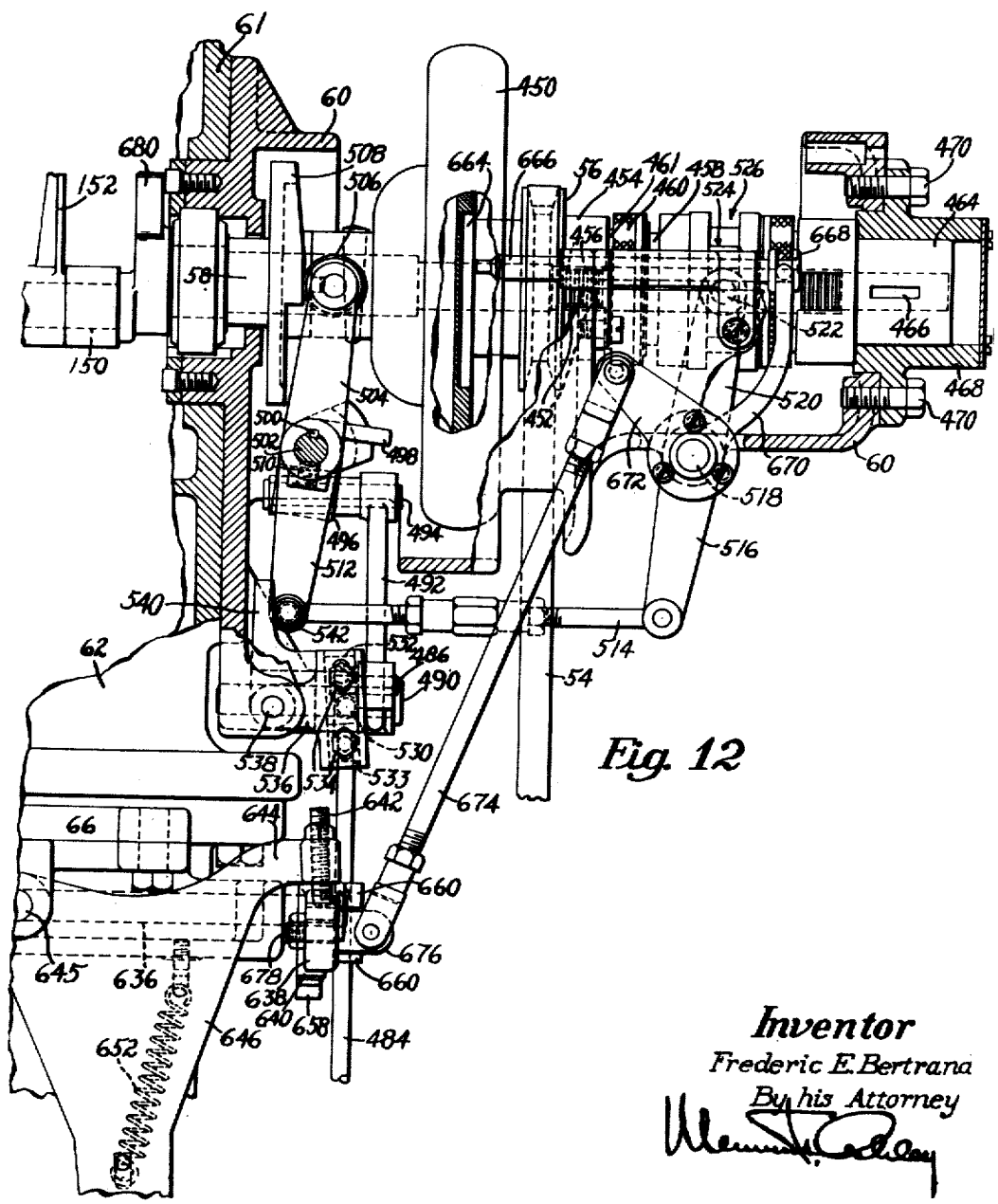
Fig. 12 is a side elevation, partly in section, of the clutch for controlling the main shaft.

The illustrated machine may be utilized for applying a ribbed strip S, such as that shown in Fig. 7, to an insole I, as indicated in Figs. 9 and 11. The machine (Figs. 1, 3 and 4) has a base portion 20 standing on the floor. A rearwardly extending casing 22 contains an electric motor connected to a shaft 23 which (Fig. 4) carries a spiral gear 24 meshing with a spiral gear 26 on a horizontal shaft 28 having end bearings 30 supported by a housing 32 mounted in the base 20. The shaft 28 carries a spiral gear 34 meshing with a similar gear 35 on a hollow vertical shaft 36 mounted for rotation in ball bearings 38 carried by a sleeve 40 suitably supported in the housing 32. Inside the hollow shaft 36 is a vertical shaft 42 shown in two parts (for convenience in assembling), the parts being connected by a coupling 43. Clamped to the upper end of the hollow shaft 36 is a coupling member 44 having upwardly projecting lugs 45, and clamped to the shaft 42 is a coupling member 46 having downwardly projecting lugs 47. Between the coupling members is a fiber disk 48 having marginal notches to receive the lugs on both the coupling members whereby the shaft 42 is driven from the shaft 36. The upper part of the shaft 42 is journaled in a housing 49 and carries a spiral gear 50 meshed with a similar gear 51 on a horizontal shaft 52 also journaled in the housing 49 and carrying a pulley 53 connected by a V-belt 54 to a pulley 56 on a main shaft 58 (Fig. 12). This shaft is journaled in a frame 60 which is secured to the rear wall of a casing 61, the casing being formed as part of the head frame 62 which is bolted at 63 (Fig. 1) to the upper portion of a hollow neck 64 slidable vertically in the upper portion of the base 20. The housing 49 is bolted at 65 (Fig. 4) to a depending portion 66 of the hollow neck 64 to which the head 62 is secured and which is movable vertically in the upper part of the base 20. The neck 64 is grooved longitudinally at 68 and the groove is engaged by a headed pin 70 adjacent to which is a screw 72 the head of which engages the head of the pin 70 to force it into the groove and hold the neck in vertically adjusted position. By loosening the collar 46 the height of the machine head may be adjusted to suit the operator without disturbing the driving connections of the motor to the shaft 58.

The insole is supported on a circular table 80 mounted to rotate freely on a central stud 81 seated in the top of a table support 82 and supported by ball bearings 84 between the table and the top of the table support 82 which is arranged to move up and down in a bearing sleeve 86 formed in a bracket 87 fixed to the head frame 62. The table support 82 (Fig. 15) is hollow and contains a compression spring 88 bearing at its upper end against the table support and at its lower end on a flanged disk 90 the lower side of which is recessed to receive the upper end of a screw 92 threaded through an arm 94 on a bracket 95 secured at 96 to the sleeve 86. The screw 92 has a thumb head 93 by which it may be turned to vary the initial tension of the spring 88 and hence the force by which the table is held up to press the insole against the operating instrumentalities. Upward movement of the table 80 in response to the spring 88 is adjustably limited by a screw 98 (Fig. 3) threaded through a split collar 100 secured by screws 101 on the lower end of the table support, the upper end of the screw 98 engaging the fixed bearing sleeve 86.

Figure 15:
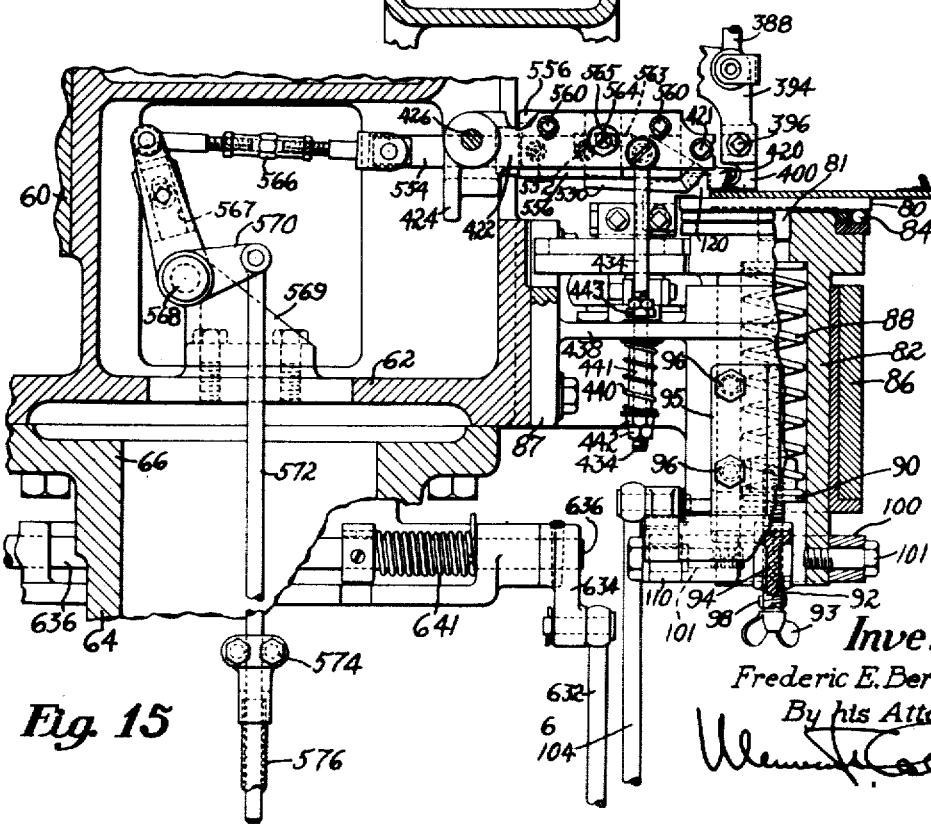
Fig. 15 is a detail view in elevation and partly in section taken from the left-hand side of the machine.

The table 80 is depressed by pressure on a treadle 102 (Fig. 4) fulcrumed on a shaft 103 and connected by an adjustable rod 104 to a lever 106 at 107 (Fig. 3). The lever is pivoted at 108 to the bracket 95 and engages between its ends a roll 110 on one of the screws 101 which hold the collar 100 to the table support 82 (Fig. 15). Depression of the table 80 by the treadle permits an insole to be placed on the table and located by engagement with an edge gage 120 (Fig. 9). The treadle rod 104 is made adjustable by making it in two parts, each part extending through an ear 112 (Fig. 4) on one end of an extension 114 where it is held by a set screw 116. By loosening the screws, the head 62 may be adjusted up or down and the screws tightened. A compression spring 118 on the rod 104 between the extension 114 and the frame 20 sustains the treadle and treadle rod.

The edge gage 120 (Fig. 9) and the mechanism for shifting it by means of a handle 122 (Fig. 3) to vary the position of the insole with respect to the strip-applying mechanism are all carried by a bracket 124 secured to the table support 82 so that when the table is moved up or down the edge gage 120 goes with it. The edge gage and the mechanism for shifting it are more fully described in my prior patent referred to above.

A reel carrying an indefinite length of the ribbed strip S is placed on a supporting rod 125 (Fig. 1) carried by a bracket 126 which is fixed to the casing 61 forming part of the head 62. The end of the strip is passed through a guide loop 128 carried by the bracket 126 and then through the feed foot of the machine indicated generally by the reference numeral 130 (Fig. 3) which is mounted on a lever 132. A portion 134 of the feed foot underlies the strip and is provided with teeth 133 (Fig. 16) to engage the insole and feed it. A portion 135 of the feed foot overlies the two flanges of the strip. Pivoted at 136 to the feed foot are two feed fingers 138, 139 urged counterclockwise by springs 140, one finger being located over each flange of the strip S, the fingers being so constructed and arranged that, when the feed foot moves to the right, the fingers 138, 139 will slip over the strip and, when it is moved to the left, the fingers grip the strip and feed it along.

The movement imparted to the feed foot 130 is substantially as indicated in the diagram in Fig. 2. Starting at A, the feed foot moves vertically to B, then horizontally from B to C to feed the work, then vertically from C to D, then horizontally back to A, and beyond A to E, and back to A. The line B—C represents the feed movement imparted to the insole; the diagonal C—A plus A—E represents the amount of feed imparted to the strip which, of course, is more than that imparted to the insole. The purpose of feeding the strip more than the insole is fed is to avoid applying the strip while it is under too much tension, which may result in distortion or "strapping" of the insole. When the tape is fed a little faster than the insole, the strip is fulled instead of stretched and, when so applied, the insole remains flat and undistorted. To meet different conditions, the distance A—E, that is, the overfeed of the strip, may be varied.

The mechanism by which the feed foot is operated is mostly enclosed in the casing 61 (Fig. 3) which has a cover 142, the mechanism therein being sprayed with oil by an oil pump.

Figure 5:
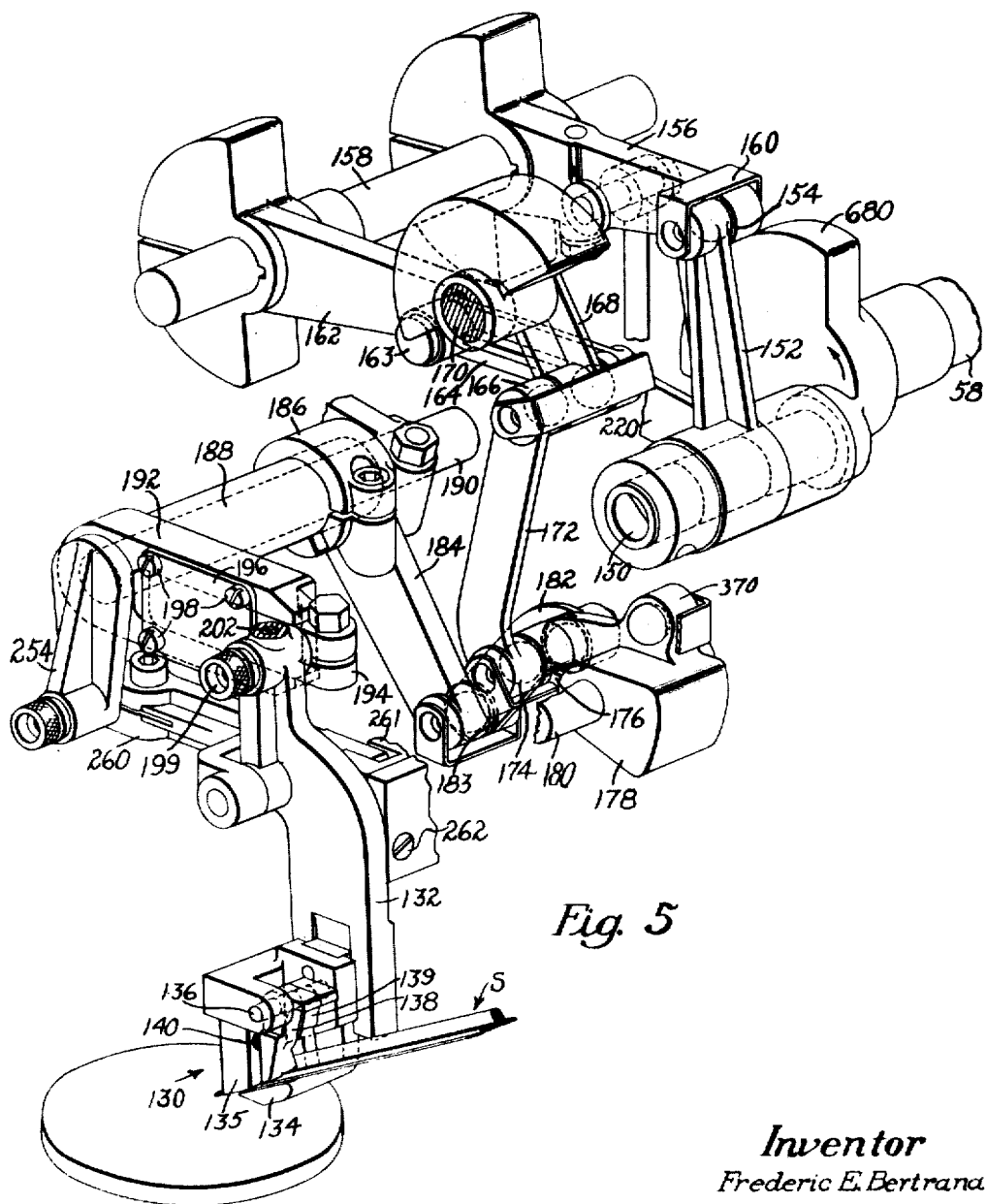
Fig. 5 is a perspective view of the mechanism for imparting up-and-down movements to the feed foot, referred to herein as the vertical system.

The vertical movements A—B and C—D are imparted to the feed foot by mechanism shown in Fig. 5, the horizontal movements B—C and D—A are imparted to the feed foot by mechanism shown in Fig. 6, and the variable extra feed A—E and E—A by mechanism shown in Fig. 8.

Figure 16:
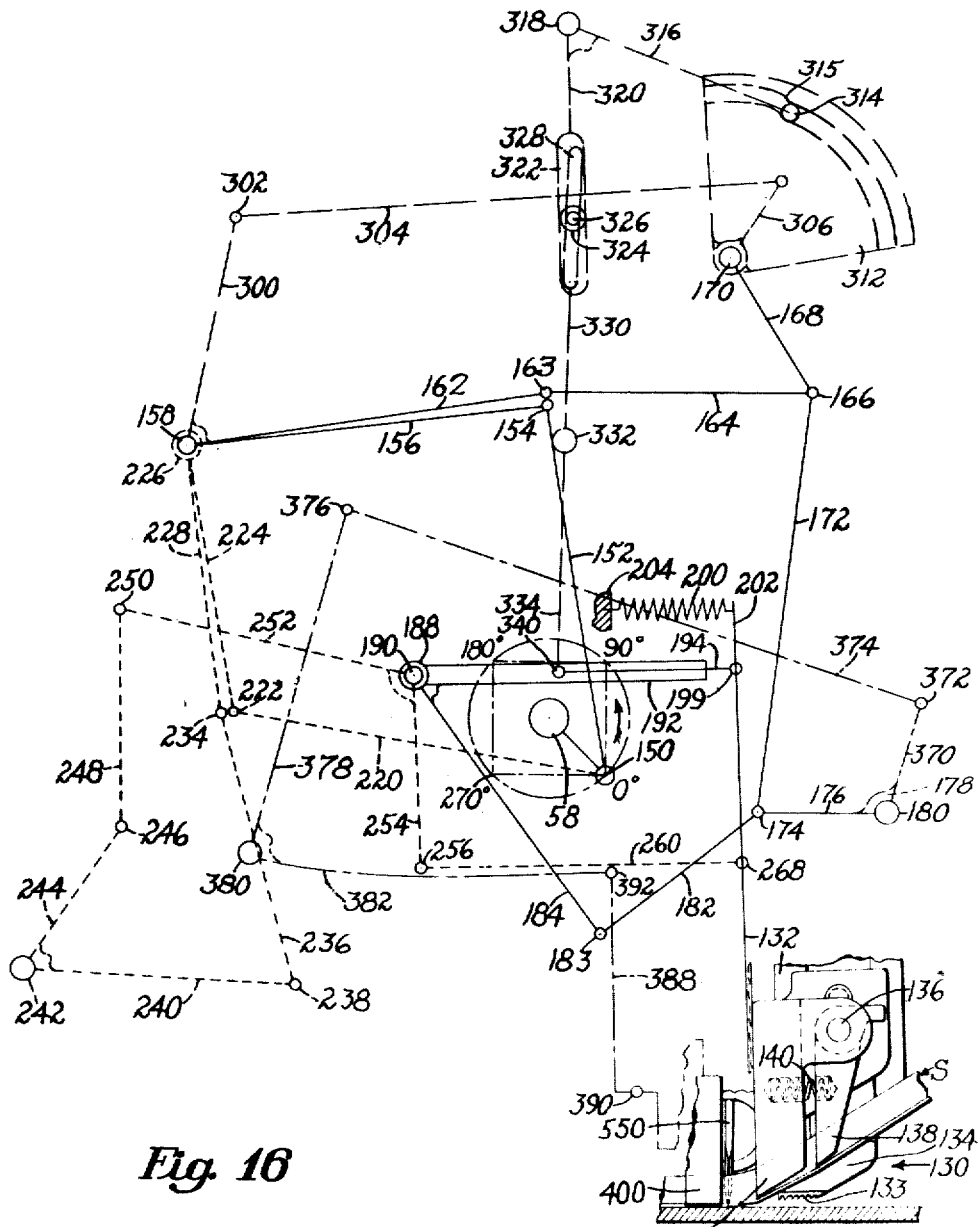
Fig. 16 is a diagrammatic view showing the various links and levers for operating the operating instrumentalities of the machine in their actual proportion and relation as seen from the front of the machine.

The mechanical system for imparting the up-and-down or vertical movements to the feed foot is shown in Fig. 5 and diagrammatically in Fig. 16 where this system is represented in full lines. This diagram shows the relative dimensions of all the links, arms and levers and the locations of their centers as they lie in the head of the machine, as seen from the front, except that coinciding arms in two instances are shown as slightly diverging for the sake of clearness.

Referring to Fig. 5, on the shaft 58 is a crank pin 150 located .625 inch from the center of the shaft and carrying a connecting rod 152 which is 2.937 inches between centers. The connecting rod 152 extends upwardly and is connected by a ball joint 154 to an arm 156 fixed to a shaft 158. The joint or coupling employed at 154 is preferably of the type disclosed more fully in my prior Letters Patent of the United States No. 2,173,155, granted September 19, 1939. Each of the parts 152, 156 is provided with a hemispherical recess, a steel ball being held in the recesses by a spring clip 160 embracing the parts. This provides a pivotal connection in which there is no lost motion and one in which any wear is automatically taken up by the spring clip. Wherever convenient, this type of connection is used in the machine and will be referred to in this description as a ball joint. Also fixed to the shaft 158 is an arm 162 of the same length as the arm 156 and coinciding with it as seen from the front of the machine. The arm 162 is pivotally connected at 163 to a link 164 the other end of which has a ball-joint connection 166 to a link 168 pivoted loosely on a fixed shaft 170. A link 172 has a ball-joint connection to both the link 164 and the link 168. As the arm 156 is oscillated by the crank 150, the arm 162 and the link 164 act as a toggle, breaking and straightening of which swing the link 168 about the shaft 170 and cause up-and-down movement of the link 172 which, with the link 168, acts as a second toggle. The lower end of the link 172 has a ball-joint connection 174 with an arm 176 projecting from a rocker 178 mounted on a fixed shaft 180. The arm 176 also has a ball-joint connection to one end of a link 182 the other end of which has a ball-joint connection 183 to an arm 184 fixed by a split clamp 186 to a sleeve 188 on a shaft 190. The sleeve extends through the front of the casing 61 and has an arm 192 fixed thereto and in which is mounted a slide 194. A groove is milled in the arm 192 to receive the slide which is held in place by a plate 196 secured by screws 198 to the arm 192. The lever 132 is pivoted at 199 to the slide 194 and is held in its innermost or leftward position by a tension spring 200 one end of which is attached to a pin 202 on the top of the lever 132 and the other to a fixed bracket 204 (Fig. 3). Up-and-down movement of the link 172 as described imparts movement to the rocker 178 about its shaft 180, and the link 182 imparts oscillating movement to the arm 184 on the sleeve 188. Hence the arm 192 fixed to the sleeve 188 is oscillated to move the pivot 199 of the lever 132 and hence the feed foot 130 up and down. The timing is such that the up-and-down movements occur between the horizontal movements, the feed foot moving substantially in a rectangular path.

Referring to Fig. 16, it will be seen that, as the crank pin 150 moves through the first quadrant of a revolution from 0° to 90° it will break the toggle 162, 164 and cause the second toggle 168, 172 and the third toggle 176, 182 to be straightened, causing the angle lever 184, 192 to move clockwise on the shaft 190. The pivot 199 of the slide 194 to the lever 132 will therefore move down and the feed foot will be moved from A to B of the diagram. Obviously also, as the crank pin moves down in the third quadrant from 180° to 270°, the foot will move up from C to D, straightening the toggle 162, 164 and breaking the other two toggles in this system. The diagram will be discussed further after the other mechanical systems for moving the foot have been explained.

Horizontal movements are imparted to the feed foot 130 by the mechanical system shown in Fig. 6 and by short dash lines in Fig. 16. The crank pin 150 has a horizontal connecting rod 220 (Fig. 6) coupled by a ball joint 222 to an arm 224 integral with a sleeve 226 mounted to rock freely on the shaft 158. The sleeve 226 has an integral arm 228 and, for convenience in machining, a member 230 is secured by screws 232 to the arm 228 to give it the same length as the arm 224, these arms coinciding, as seen from the front of the machine. The part 230 of the arm 228 is connected by a ball joint 234 to a link 236 which is connected by a ball joint 238 to an arm 240 fixed to a rockshaft 242. The rockshaft has fixed thereto an arm 244 connected by a ball joint 246 to a link 248 which is connected by a ball joint 250 to an arm 252 fixed to the shaft 190 which projects through the front of the casing 61 and carries a downwardly extending arm 254 in the lower end of which is a pin 256 held by a split clamp 258 in one end of a link 260, the other end of which is flat and is guided between vertical surfaces formed in a block 261 secured by screws 262 to a bracket 264 mounted on the casing 61 (Fig. 3). A bracket 266 (Fig. 6) on the link 260 embraces the lever 132, and a pin 268 pivots the lever to the bracket and to the link 260.

Regarding the pivot 199 of the lever 132 as fixed, it will be seen that rotation of the crank 150 will oscillate the sleeve 226 on the shaft 158, thus breaking and straightening the toggle formed by the arm 230 and the link 236. Thus, the free end of the arm 240 fixed to the rockshaft 242 will move up and down, causing the toggle formed by the arm 244 fixed to the shaft 242 and the link 248 to be straightened and broken, thus causing oscillation of the arm 252 and hence of the arm 254 since both are fixed to the rockshaft 190. Oscillation of the arm 254 will, through the link 260, impart movements to the lever 132 about the pivot 199, causing the feed foot to move to and fro substantially horizontally.

From Fig. 16 it will be seen that as the crank pin 150 moves through the second quadrant from 90° to 180° its movement will be nearly horizontal, and that the connecting rod 220 will break the toggle 228, 236, thus moving the angle lever 240, 244 counterclockwise and straightening the toggle 244, 248. This toggle when straightened lifts the arm 252 fast to the shaft 190 and moves the arm 254 leftward, the link 260 then moving the lever 132 about the center 199 to impart feed movement B—C (Fig. 2) to the feed foot 130. In the fourth quadrant from 270° to 0° these movements will of course, be reversed, the feed foot moving from D to A of the diagram.

The relation between the vertical and horizontal systems will now be apparent from Fig. 16. As the crank pin 150 moves from 0° to 90° to lower the feed foot, its horizontal movement, which is only the distance of the chord of a 90-degree arc to the circumference of its circle, is absorbed by moving the joint 234 of the toggle 228, 236 through that small distance which does not appreciably affect the length of the toggle which is then near its straight position. When the crank pin 150 is moving down from 180° to 270° the toggle 244, 248 is straight and the horizontal movement of the pin is absorbed or nullified by a slight movement of the joint 246 of that toggle.

During movement of the pin 150 from 90° to 180° to produce the feed movement of the foot 130, the toggle 162, 164 is broken and the toggles 168, 172 and 176, 182 are straight so that the vertical movement of the pin through that arc will be absorbed by slight movement of the joints 168, 174.

During movement of the pin 150 from 270° to 0° to move the feed foot from D to A, the vertical movement of the pin will be nullified by slight movement of the joint 163 of the toggle 162, 164 which is then straight.

In order to impart the extra feed movement (A—E) of the diagram (Fig. 2) to the feed foot to feed the strip more than the insole is fed, the mechanism shown in Fig. 8 is provided. On the shaft 158 which is oscillated by the upright connecting rod 152 is an arm 300 held to the shaft by a split clamp 302. The arm is connected by a link 304 to an arm 306 fixed by a split clamp 308 to the shaft 170 which passes through the front of the casing 61 and has secured to it a segmental path cam 312 the path of which is engaged by a roll 314 on an arm 316 of a bell-crank lever fulcrumed on a fixed shaft 318. The other arm 320 of the lever is slotted at 322 to receive a roll 324 on the stud 326 of which passes through a slot 328 in an arm 330 of a lever having a fixed fulcrum on a shaft 332, the other arm 334 of the lever extending down at the rear of the slide 194. The arm 334 is bored longitudinally to receive a pin 336 extending upwardly from a block 338. The block has a hole at right angles to the pin 336 which is engaged by a pin 340 fixed to the slide 194 and passing through a slot in the rear face of the arm 192 into the hole. Thus, oscillation of the lever arm 334 will move the slide 194 lengthwise of the arm 192, the arcuate movement of the lever arm 334 being compensated for by sliding of the pin 336 in the arm.

As the crank pin 150 moves up and down, the arm 300 swings back and forth and imparts its movement to the arm 306 and the shaft 170 to the cam 312, the path of which is for the most part concentric with the shaft 170 but which, as it approaches the limit of its clockwise movement, allows the roll 314 to move slightly upward by engaging a portion 315 of the cam which is farther from its center, hence permitting counterclockwise movement of the bell-crank 316, 320. This movement swings the arms 328 and 330 to the right and the arm 334 to the left, causing leftwise movement of the slide 194 and hence of the upper pivot 199 of the feed-foot-carrying lever 132, this lever now fulcruming counterclockwise on its pivot 268 and causing the feed foot 130 to move to the right to the point E of the diagram. The timing is such that the action of the cam 312 occurs during the upper horizontal movement D—A of the feed foot, that is, in the lower quadrant (270°–0°), and the heightwise movement of the crank pin 150 in that quadrant is utilized to move the cam 312 clockwise, enough to allow the roll 314 to engage the part 315 of the cam, for an instant and then to move the cam back again to the position shown. This causes the feed foot to move to the point E of the diagram and back to A, the counterclockwise movement of the cam occurring as the crank pin rises from its lowest point to 0°.

The position of the cam 312 on its shaft 170 to effect the operation above described is rather critical. Accordingly, the cam 312 (Fig. 8) is loose on its shaft 170 and is provided with a depending portion 350. A split clamp 352 held tightly to the shaft by a screw 354 and preferably keyed thereto is provided with a depending portion 356 corresponding to the portion 350 of the cam. By clamping these depending portions temporarily together and adjusting them relatively to each other, the proper position of the cam relatively to the shaft 170 may be found, whereupon the depending portion of the cam and the split clamp are secured permanently together by screws 358.

In the diagram of Fig. 16 the mechanism just described is shown in long dash lines. As the crank pin 150 moves through the fourth quadrant from 270° to 0° to give the feed foot its movement from D to A, there will be a slight vertical movement of the connecting rod 152 to and from its extreme lower position. The arm 300 therefore moves slightly to the right and back again and, through the link 304, moves arm 306 and the cam 312 clockwise, causing the roll 314 to move into the part 315 of the cam and back again. Thus, through the mechanism described, the slide 194 is moved to the left sufficiently to cause the feed foot 130 fulcruming on the center 268 to move to the point E of the diagram and back to A, this distance representing the amount the strip is fed more than the diagonal distance C—A which itself is more than the work is fed, the work feed being represented by the line B—C. The cam 312, being a path cam, positively actuates the roll 314. The spring 200 serves to take up any lost motion in the joints connecting the lever 132 to the cam and normally holds the cam roll 314 against the outer wall of the cam track. The amount of the strip feed A—E can be varied by adjusting the roll 324 up or down in the slot 322 of the arm 320.

Means for pressing the inner flange F of the strip S is provided which acts also to tuck the material of the strip sharply into the angle between the inner face of the rib and the inner flange F. As shown in Fig. 9, the rocker 178 has an upwardly extending arm 370 connected by a ball joint 372 to one end of a link 374, the other end of which is connected by a ball joint 376 to an upright arm 378 fixed to a rockshaft 380. The shaft extends through the front wall of the casing 61 (Fig. 3) and has adjustably secured thereto a horizontal arm 382. A member 384 (Fig. 9) is pivoted on a fixed shaft 386 mounted in a bracket 387 secured to the casing 61. The member is oscillated about the shaft 386 by a vertical link 388 connected at its lower end by a ball joint 390 to the member and at its upper end to the end of the arm 382 by a ball joint 392. The member 384 has a downward extension 394 to which is adjustably secured by a screw 396 a pressing and tucking foot 400 the lower face of which engages and presses the inner flange F of the strip S down upon the insole I and the rear face of which is outwardly and upwardly inclined to enable its lower rear corner to engage the strip material in the acute angle between the rib R and the inner flange F. Since the tucking foot moves in a circular arc determined by the shaft 386, its up-and-down movement has a rearward component acting toward the rib and into the angle between the rib and the flange.

Since the operating connections for the tucking foot 400 are positive, it is desirable to provide adjustment for the lower limit of its movement. Hence the arm 382 is made adjustable with respect to the shaft 380. The shaft has an integral collar 402 and a reduced portion 404 that extends through a hole in the arm 382. Screws 406 with conical ends (Fig. 10) are threaded through the arm 382, their conical ends entering holes 408 in the collar 402 and each conical end bearing on one side of its hole. For example, each conical end may bear on the lower side of its hole; then, by turning one screw 406 out and the other in, the free end of the arm 382 will be moved up or down about the axis of the shaft 380. The screws 406 are secured in adjusted position by set nuts 410 and, after adjustment, the arm is securely fastened to the collar 402 by screws 412 (Fig. 9) passing through slots in the arm 382 and threaded into the collar 402.

The outer flange F' of the strip is laid by means best shown in Figs. 9 and 15 and consists of a holddown or presser foot 420 adjustably secured at 421 to an arm 422 on a yoke 424 pivoted on short shafts 426, 427 having bearings in the machine head 62. The foot 420 has a surface 428 (Fig. 11) which presses on the outer flange F' of the strip and a surface 430 which extends up the outer wall of the rib R, the foot extending over the upper edge of the rib in the form of a hook 432. The hook serves as a guide for the rib but does not extend far enough to interfere with the action of the tucking foot 400.

The foot 420 has a slight upward yield (Fig. 15) to provide which the arm 422 has a rod 434 attached to it, the rod extending down through a hole in a web 438 of the bracket 87. On the rod below the web is a compression spring 440 lighter than the table spring 88, and on the rod within the spring 440 is a sleeve 441, the spring and sleeve being held on the rod by a washer and nuts 442. The sleeve is shorter than the spring to permit a slight upward yield of the foot to maintain a light pressure through the spring 440 on the outer flange F' of the strip when the feed foot 130 has depressed the table and is feeding the insole. When the table 80 is lowered to remove the work, descent of the foot 420 is limited by engagement of stop nuts 443, threaded on the rod 434, with the web. When, during operation of the machine, the table 80 is allowed to rise, the sleeve 441 engages the web 438, thus limiting upward movement of the foot 420 against which the outer flange is then pressed by the spring 88. At the same time, the tucking foot 400 is in contact with the inner flange of the strip and the pressure of the table spring 88 is, by proper adjustment of the downward movement of the tucking foot by means of the mechanism shown in Fig. 10, properly distributed between the presser foot 420 and the tucking foot 400 to cement the strip firmly to the insole.

The driven pulley 56 having thereon a hand wheel 450 is connected to and disconnected from the main shaft 58 (Fig. 12) by a multiple-disk clutch of known type. A series of disks 452 is secured to a hub portion 454 of the pulley to rotate therewith, and an alternate series of disks 456 is connected to the shaft 58. A sleeve 458 splined to the shaft is longitudinally movable thereon, and to vary its effective length a knurled collar 460 is threaded on one end of the sleeve and has a reduced portion 461 to press upon the disks 452, 456. At the other end of the sleeve is a similar collar 460 for engaging two series of disks similar to 452, 456, one series rotating with the shaft and the other series, alternating with the first, being secured to a sleeve 464 keyed at 466 in a member 468 secured by screws 470 to the frame 60. When the sleeve is moved to the left (Fig. 12) the disks 452, 456 are pressed together and the pulley 56 drives the shaft 58. When the sleeve is moved to the right, the right-hand disks are pressed together and the shaft is stopped.

The clutch is controlled by a treadle 480 (Fig. 4) fulcrumed on the shaft 183 like the treadle 182 and connected to a treadle rod 484 made adjustable in the same manner as the rod 104, the treadle being raised by a compression spring 485 located on the rod 484 between the base and a collar on the rod. The upper end of the treadle rod (Fig. 13) is pivoted at 486 to an arm 488 of an angle lever fulcrumed at 490 on the head 60 and having a longer arm 492 on which is pivoted at 494 a block arranged to move heightwise between projections 496 on a sliding yoke 498. The yoke is splined at 500 to a horizontal shaft 502 having bearings at its ends on the frame 60.

Extending upwardly from the yoke is an arm 504 carrying a roll 506 which engages a cam 508. On the shaft 502 is splined and secured by a set screw 510 a depending arm 512 which is connected by an adjustable link 514 (Fig. 12) to a lower arm 516 of a lever fulcrumed at 518 on the frame 60. An upper arm 520 of the lever is in the form of a yoke to the arms of which are pivoted at 522 blocks 524 which slide in a peripheral groove 526 in the sleeve 458. The link 514 is so adjusted that, when the high part of the cam 508 engages the roll 506, the lever 504, 512 will pull on the rod 514 and, through the lever 516, 520, move the sleeve 458 to the right, applying pressure to the right-hand series of disks and stopping the machine.

To start the machine, the treadle 480 is depressed to pull on the rod 484 which turns the lever 488, 492 (Fig. 13) counterclockwise, causing the yoke 498 to slide to the left on the shaft 502 and the roll 506 to move off the cam 508, thus releasing pressure on the right-hand series of disks (Fig. 12).

To apply pressure to the left-hand series of disks and cause the shaft 58 to be driven, the treadle rod 484 carries near its upper end a roll or stud 530 (Fig. 13) which is located between two blocks 532, 533 adjustably held by screws 534 to an arm 536 (Fig. 12) of an angle lever fulcrumed at 538 on the frame 60 and having an upwardly extending arm 540 which engages a roll 542 mounted on the depending arm 512. Further pressure on the treadle acts through the lever 536, 540 to push the link 514 in a direction to move the sleeve 458 to the left and, by pressure on the left-hand series of disks, to cause the shaft 58 to be driven. Upon release of the treadle 480 the compression spring 485 reacts to move the roll 506 in position to be engaged by the cam 508 the projection of which engages the roll and applies pressure to the right-hand disks to stop the shaft 58.

The strip S is usually applied to the insole I by starting at one end of the breast line on one side of the insole and applying the strip along the shank and around the forepart and shank to the other end of the breast line where the strip must be severed.

Operator-controlled power-operated means is provided for severing the strip operable only after the shaft 58 has been stopped in that portion of its revolution when the feed foot 130 is widely separated from the tucking foot 400 so that a horizontally moving knife having a cutting edge on its lower side may move across the strip between these feet. A knife 550 (Figs. 9 and 15) located in a vertical plane has its lower edge sharpened, the outer portion of its edge extending upwardly at an obtuse angle to about the height of the rib R. The longer portion of its edge is at an angle of about 2° to the horizontal to cause the cutting to be done pricipally by the corner where the two portions of the edge meet at the obtuse angle. The blade 550 is fixedly mounted by screws 552 in the split end of a shaft 554. Mounted for vertical adjustment on the arm 422 is a block 556 (Figs. 9), the block having a vertical rib 558 set into a corresponding groove in the arm 422 and being held in adjusted position by screws 560 (Fig. 15). The block 556 (Fig. 9) is bored longitudinally slidingly to receive the shaft 554, there being a slot along the lower side of the bore to permit the knife edge to extend slightly below the lower face of the block 556. Holes 562 are provided in the block to afford access to the screws 552 which hold the knife in the shaft.

By loosening the screws 560 the block 556 guided by the rib 558 may be adjusted heightwise so that the obtuse angle between the cutting edges of the knife 550 will be in a plane the thickness of the flange F' below the surface 428 of the foot 420 which rests upon the flange and against which the insole is held by the table spring 88. Thus, when the knife 550 is moved horizontally outward, it will sever the strip without cutting into the insole.

To facilitate fine adjustment of the knife vertically, the block 556 is provided with a horizontal slot 563 (Fig. 15) which is engaged by an eccentric stud on the head of a screw 564, the screw head being countersunk in the arm 422 and the screw extending through the arm and being provided with a screw-driver slot in its end and with a set nut 565 on its outer threaded portion. By loosening the nut 565 and the screws 560, the block 556, and hence the knife, may be adjusted vertically relatively to the arm 422 by turning the screw 564 with a screw driver, the holes in the arm 422 through which the screws 60 extend being elongated vertically to permit such relative adjustment.

Figure 14:
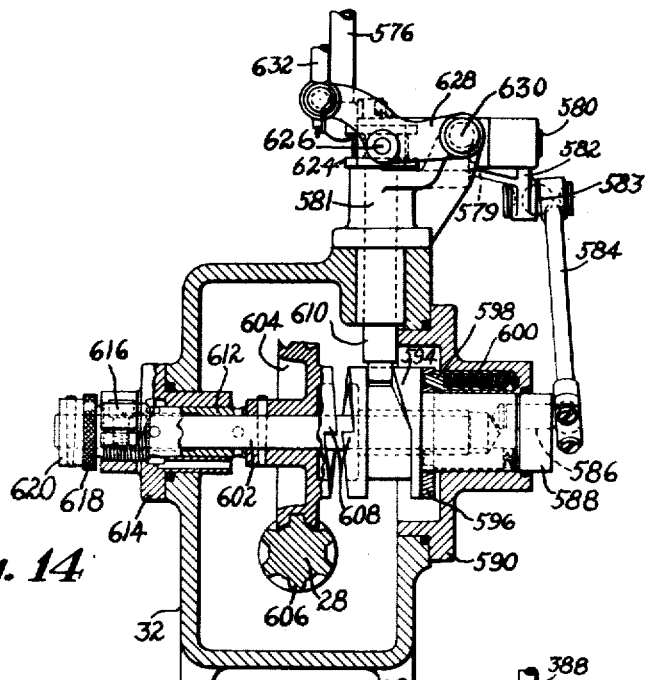
Fig. 14 is a view, partly in section, of the knife-operating clutch mechanism.

To operate the knife, the shaft 554 (Fig. 15) is connected by an adjustable link 566 to an arm 567 of an angle lever fulcrumed at 568 on a bracket 569 in the head frame 62. The other arm 570 of the angle lever is connected to a vertical rod 572 (Fig. 4) secured at 574 in the upper end of an extension 576 which is pivoted to an arm 578 fixed to a shaft 580 journaled in a bracket 581 secured to the housing 32. Another arm 582 fixed to the shaft 580 is linked by a ball joint 583 to the upper end of a connecting rod 584 which has a universal joint connection to a crank pin 586 (Fig. 14).

Figure 4:
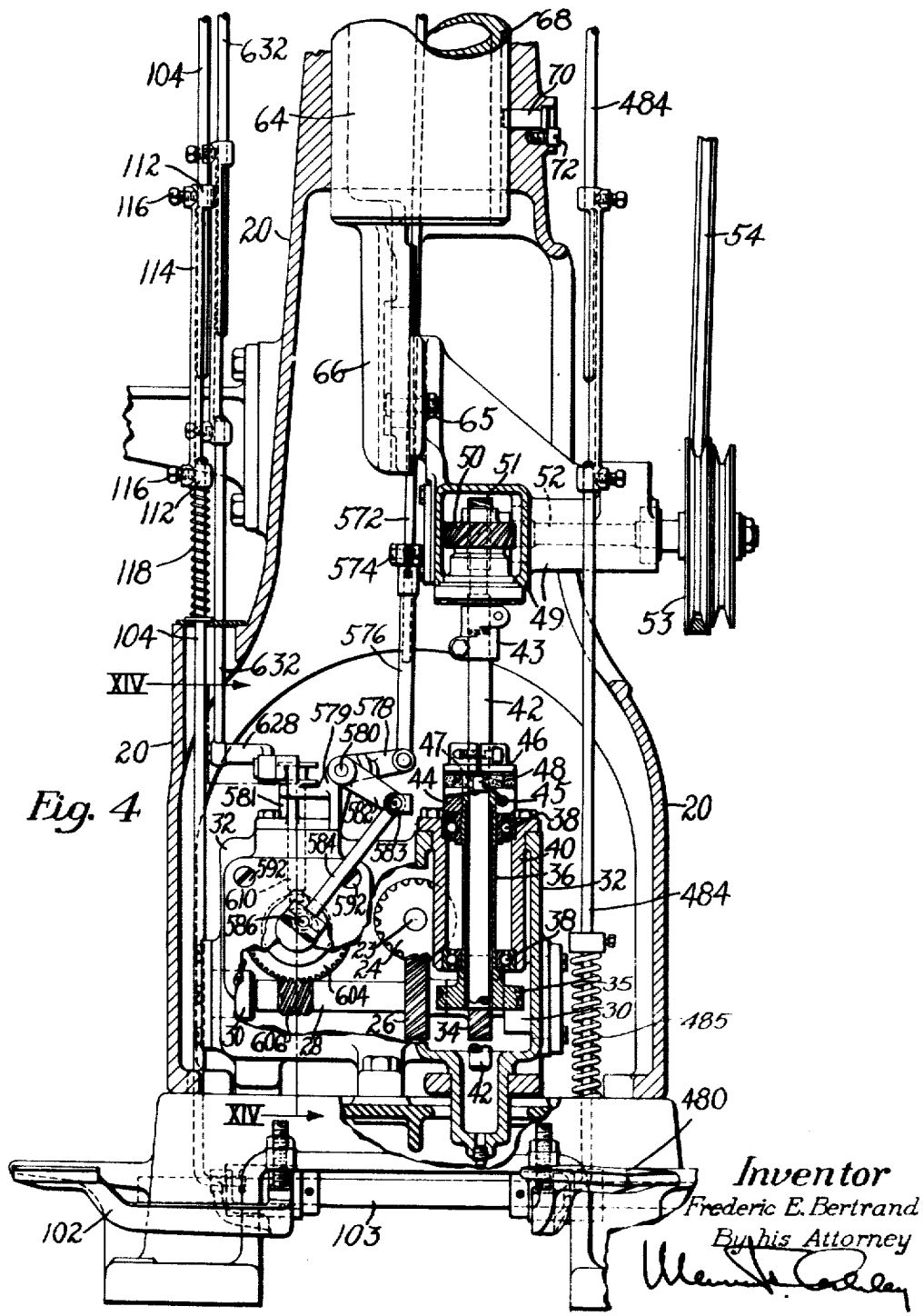
Fig. 4 is a vertical section of the base portion of the machine.

The crank pin is eccentrically fixed in the end of a cylindrical member 588 having a bushed bearing in a plate 590 fixed by screws 592 to the housing 32 (Fig. 4). The member 588 has a larger portion formed as a cam 594 (Fig. 14). Against the right-hand face of the larger portion of the member is a bearing ring 596 which is urged to the left by hollow plungers 598 containing springs 600. The member 588 is bored and bushed to receive a shaft 602 which is pinned to a worm wheel 604 continuously driven when the shaft 23 is rotating by a worm 606 on the shaft 23 (Fig. 4).

The adjacent faces of the worm wheel 604 (Fig. 14) and of the cammed portion of the member 588 are each provided with a plurality of dogs 608 which are normally held out of engagement by a pin 610 engaging the cam 594. When the pin is lifted the springs 600 push the dogs 608 into engagement, causing the member 588 to be rotated and the crank pin 586 to operate the knife 550 through the connections described.

The end thrust of the shaft 602 (Fig. 14) is taken by a sleeve 612 in which the shaft rotates. The sleeve can turn and move endwise in a cylindrical bore in a member 614 which is suitably secured to the housing 32. The outer portion of the member is threaded to the outer portion of the sleeve 612 and has a split clamp 616 by which the sleeve is held against rotation. When this is loosened the sleeve 612 may be turned by an exposed knurled head 618 outside of which a collar 620 is pinned to the shaft 602. Turning of the sleeve adjusts it and hence the shaft longitudinally to obtain the proper relation between the worm 606 and the worm wheel 604, this adjustment being maintained by the split clamp 616. Suitable oil passages are provided as shown.

The pin 610 is mounted for vertical movement in the bracket 579 secured to the top of the housing 32 and has a grooved head 624 at its upper end, the groove of which is engaged by a pin or roll 626 on a lever 628 fulcrumed at 630 on the bracket 579. The lever 628 is pivotally connected to a rod 632 made extensible like the rod 104 and leading up to a point at the rear of the lower end of the table support where it is jointed to an arm 634 (Figs. 1 and 15) on a rockshaft 636 extending from front to rear of the machine (Fig. 13) where a member having two arms 638, 640 is fixed to it, these arms and the arm 634 being held at the limit of their clockwise rotation with the shaft 636 by a helical torsion spring 641 on the shaft 636 (Fig. 15). The arm 638 (Fig. 13) is in the path of a screw 642 threaded through an arm 644 (Fig. 1) of an angle lever fulcrumed to the machine head at 645 and having an arm 646 extending down through a slot in a work table 648. The lower end of the arm 646 has a knee pad 650 secured to it, the pad being adjustable heightwise and about a vertical axis. The lever 646 is held in the position shown by a tension spring 652 (Fig. 13) connected at one end to the lever and at the other end to the machine head. Pressure on the pad 650 to swing the lever causes the screw 642 to depress the arm 638 and turn the shaft 636 in a direction to lift the arm 634, the rod 632, the lever 628 (Fig. 14) and the pin 610, thus permitting the springs 600 to set the clutch to operate the knife 550. If the knee lever is at once released, the pin 610 drops back into the path of the cam 594 which separates the clutch dogs 608 after one revolution. If the knife is operated more than once no harm is done.

The feed foot 130 and the tucking foot 400 come very close together at the end of a feed movement and these movements may be taking place at the rate of 1470 per minute. It would therefore be disastrous to operate the knife while the machine is in operation. To prevent such operation of the knife, the clutch treadle rod 484 passes through an ear 653 (Fig. 13) pivoted to an arm 654 of a lever having a fixed fulcrum at 656 on a bracket 657. The end of the other arm 658 of the lever is adjacent to the arm 640 on the shaft 636. On the treadle rod 484 collars 660 are secured one above and one below the ear 653. When the treadle rod is depressed to start the machine, the arm 658 moves clockwise and the end of the arm passes by the end of the arm 640, thus preventing rotation of the shaft 636 in the direction to cause operation of the knife 550 while the machine is running to apply the strip.

Figure 13:
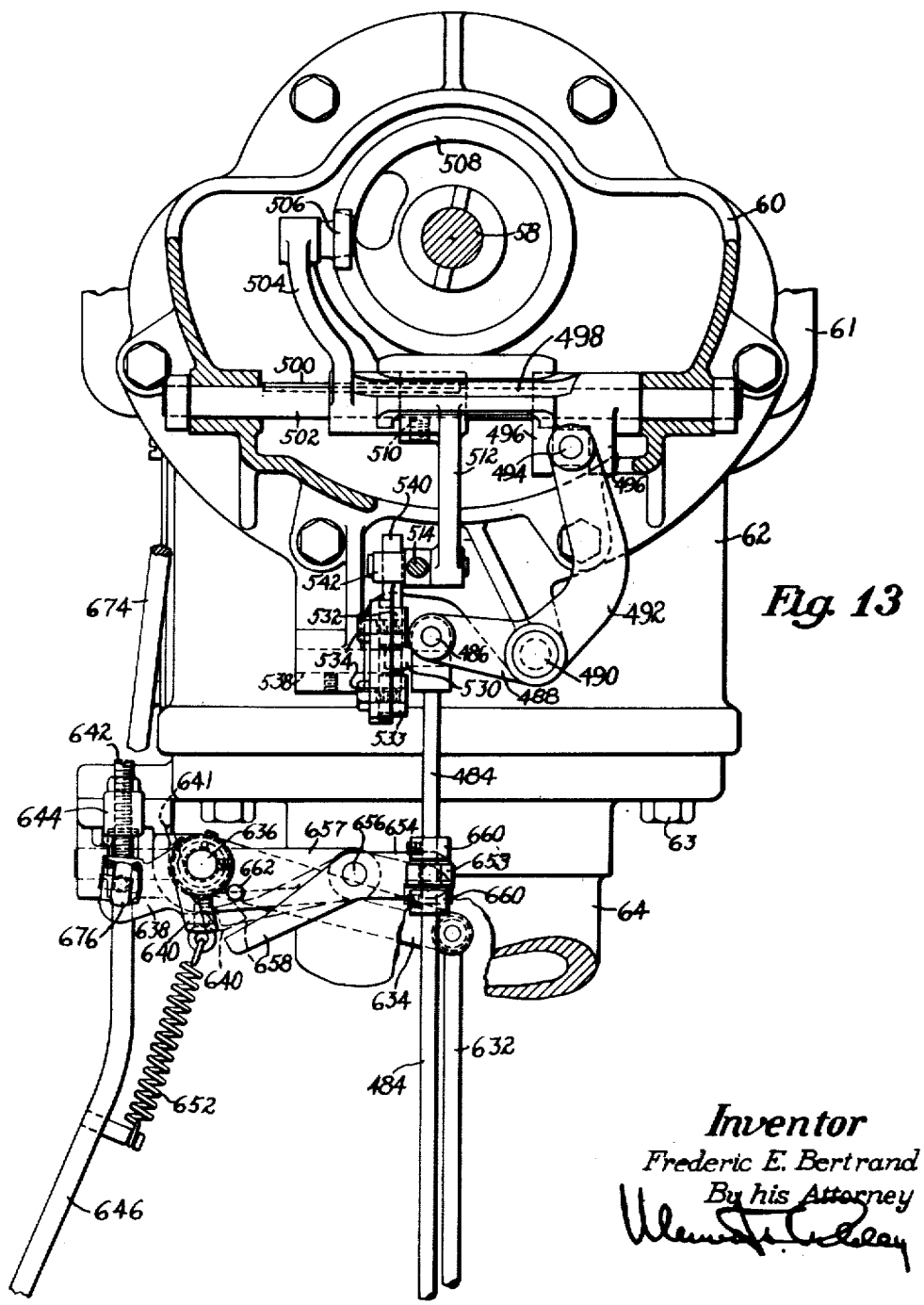
Fig. 13 is a rear elevation, partly in section, of parts shown in Fig. 12.

Furthermore, when the knife is being operated, it should be impossible, for safety's sake, to operate the strip-applying mechanism. Accordingly, as shown in Fig. 13, when the knife clutch has been tripped, the arm 640 assumes the position shown in dotted lines against a stop pin 662, in which position it lies above the arm 658 and hence prevents depression of the treadle rod 484 to cause operation of the strip-applying mechanism. Thus, the operation of the two clutches is mutually exclusive since neither can be operated when the other is in operation.

There is also a possibility that the clutch on the main shaft 58 might get out of adjustment to such an extent that it failed to stop the shaft in that region of its rotation in which the knife 550 could be safely operated or the shaft might be turned by hand to such a position. To prevent operation of the knife under such conditions, the web of the hand wheel 450 (Fig. 12) is provided with an arcuate groove 664 extending through an arc representing that portion of the rotation of the wheel in which the knife 550 can be safely operated, that is, while the tucking foot 400 and the feed foot 130 are most widely separated.

A feeler rod 666 is mounted for limited endwise movement in the frame 60 and has a grooved head 668 at its right-hand end the groove of which is engaged by the upper end of an arm 670 of an angle lever pivoted on the shaft 518 and having an arm 672 connected by a link 674 to an ear 676 pivoted at 678 to the arm 638. If the machine has stopped with the groove 664 opposite the feeler rod 666 it can enter the groove and the knee lever 646 can be operated, but if the machine has stopped with an ungrooved part of the hand wheel opposite the feeler rod longitudinal movement of the rod is prevented and hence the knee lever cannot turn the arm 638 to raise the rod 632 to trip the knife clutch.

It will be noted that the rotating and oscillating parts are provided with counterweights to minimize vibration; for example (Fig. 6), the shaft 68 has a counterweight 680 equivalent to the weight of the crank pin and a large part of the connecting rods 152, 220, the sleeve 226 is counterweighted at 682 to counterbalance the arms 224, 228 and 230 and a portion of the connected parts 236, 220, and other oscillating parts are similarly counterweighted as shown.

A motor-controlling switch 684 (Fig. 1) is located on the base 20. A lamp 686 controlled by a switch 688 is attached to the bracket 126 and is arranged to throw light upon the work at the operating point. A removable shell 690 is provided to cover the mechanism outside of the front wall of the casing 61, and a hinged cover 692 protects the clutch at the rear of the machine.

Having thus described my invention, what I claim as new and desire to secure by Letters Patent of the United States is:

1. In a machine for operating on soles, a frame, a feed foot mounted on the frame for up-and-down and to-and-fro movements, a table mounted on the frame below the feed foot for supporting a sole, a crank rotatable in a vertical plane, toggles and angle levers between the crank and the feed foot for imparting to the feed foot vertical movements only of the crank to move the feed foot up and down, and toggles and angle levers between the crank and the feed foot for imparting to the feed foot horizontal movements only of the crank to move the feed foot to and fro.

2. In a machine for operating on soles, means for supporting a sole, means for operating on the sole rotating in a vertical plane, a feed foot for feeding the sole past the operating means, a crank, means for utilizing vertical movements only of the crank to move the foot heightwise, and means for utilizing the horizontal movements only of said crank to move the foot horizontally.

3. In a machine for operating on soles, means for supporting a sole, means for operating on the sole, a feed foot for feeding the sole past the operating means, a single crank movable about a horizontal axis, means for utilizing the vertical movements of the crank to move the foot heightwise, means for utilizing the horizontal movements of the crank to move the foot horizontally, and means for nullifying the vertical movement of the crank while it is moving horizontally.

4. In a machine for operating on soles, a yielding table for supporting a sole, means for operating on the sole, a feed foot for feeding the sole past the operating means, a crank, toggles for positively transmitting vertical movements only of the crank to move the foot heightwise, and toggles for positively transmitting horizontal movements only of the crank to move the foot horizontally.

5. In a machine for operating on soles, a yielding table for supporting a sole, means for operating on the sole, a feed foot for feeding the sole past the operating means, a crank, means for positively transmitting the vertical movements of the crank to move the foot heightwise, means for positively transmitting the horizontal movements of the crank to move the foot horizontally, means for nullifying the vertical movements of the crank while it is moving horizontally, and means for nullifying the horizontal movements of the crank when it is moving vertically.

6. In a machine for operating on soles, a yieldingly sustained work support, operating means, a feed foot for advancing the work toward the operating means, a crank pin moving in a vertical circle, connections from the pin to the feed foot to cause upward movement of the feed foot when the pin is moving down, separate connections from the pin to the feed foot to cause leftward movement of the feed foot when the pin is moving to the left, means for nullifying the right and left components of the up-and-down movements of the pin, and separate means for nullifying the heightwise components of the left and right movements of the pin.

7. In a machine for operating on soles, a yieldingly sustained work support, operating means, a feed foot for advancing the work toward the operating means, a crank pin moving in a vertical circle, positive connections from the pin to the feed foot to cause upward movement of the feed foot when the pin is moving down, separate positive connections from the pin to the feed foot to cause leftward movement of the feed foot when the pin is moving to the left, means for nullifying the right and left components of the up-and-down movement, and separate means for nullifying the heightwise components of the left and right movements of the pin.

8. In a machine for operating upon soles, a yielding support for a sole, means for operating upon the sole, a four-motion feed foot for advancing the sole to the operating means, a crank pin moving in a circle, connections from the crank pin to the feed foot including toggles arranged to move the feed foot vertically, and connections from the crank pin to the feed foot including toggles to move the feed foot horizontally, the arrangement being such that during downward movement of the feed foot one of the first-mentioned toggles is bent and another straightened and that during the horizontal movement of the feed foot one of the second-mentioned toggles is bent and another straightened.

9. In a machine for operating upon soles, a yielding support for a sole, means for operating upon the sole, a four-motion feed foot for advancing the sole to the operating means, a crank pin moving in a circle, positive connections from the crank pin to the feed foot including toggles arranged to move the feed foot vertically, and positive connections from the crank pin to the feed foot including toggles to move the feed foot horizontally, the arrangement being such that during downward movement of the feed foot one of the first-mentioned toggles is bent and another straightened and that during the horizontal movement of the feed foot one of the second-mentioned toggles is bent and another straightened.

10. In a machine for operating on shoe parts, a yieldingly supported work table, a four-motion feed foot for advancing the work, a crank pin moving in a circle, connections from the crank pin to the feed foot comprising a first system including toggles and an angle lever for imparting up-and-down movement to the feed foot, and a second system including toggles and angle levers for imparting horizontal movement to the feed foot, upward movement of the crank acting through the first system to bend one toggle and straighten another to move the foot vertically, the horizontal movement of the crank pin during said vertical movement being nullified by moving one of the toggles of the second system while it is in a substantially straight position whereby the feed foot is moved in a straight line.

11. In a machine for operating upon shoe parts, a yielding work support, a feed foot positively operating in a closed path, and means for operating the feed foot comprising a crank pin, a first system of mechanism including toggles and connections from the crank pin to the feed foot to move it vertically by bending one toggle and straightening another and a second system of mechanism including toggles and connections from the crank pin to the feed foot to move it horizontally by bending one toggle of the second system and straightening another whereby, during vertical movement of the feed foot, the horizontal component of the movement of the crank is nullified and, during horizontal movement of the feed foot, the vertical component of the movement of the feed foot is nullified and the feed foot moves in a substantially rectangular closed path.

12. In a machine for operating on soles, a feed foot, a crank pin movable in a circle having upper, lower, right and left quadrants, means for utilizing the vertical movements of the pin in the right and left quadrants to move the feed foot up and down, means for utilizing the movements of the pin in the upper and lower quadrants to move the foot horizontally, means for nullifying the horizontal movements of the pin in the right and left quadrants, and means for nullifying the vertical movements of the pin in the upper and lower quadrants.

13. In a machine for operating on soles, a feed foot, a crank pin movable in a circle having upper, lower, right and left quadrants, means for utilizing the vertical movements of the pin in the right and left quadrants to move the feed foot up and down, means for utilizing the movements of the pin in the upper and lower quadrants to move the foot horizontally, means for nullifying the horizontal movements of the pin in the right and left quadrants, means for nullifying the vertical movements of the pin in the upper and lower quadrants, and means for utilizing the vertical movement of the pin in the lower quadrant for increasing movement of the feed foot while raised.

14. In a strip-applying machine, a tucking foot, means for effecting vertical movements of the tucking foot to press a strip on the work, a feed foot, means for operating the feed foot in an orbital path one limit of which is close to the feed foot, a knife arranged to move between the tucking foot and the feed foot, means for arresting operation of the machine when the feed foot and tucking foot are separated, and power-operated means under control of the operator for operating the knife to sever the strip.

15. In a strip-applying machine, a yielding table, a tucking foot, means for effecting positive movements of the tucking foot to press a strip on the work, a feed foot, means for positively operating the feed foot in an orbital path one limit of which is close to the feed foot, means for stopping the machine with the feed foot raised and spaced from the tucking foot, a knife arranged to move between the tucking foot and the feed foot, and power operated means under control of the operator for severing the strip.

16. In a machine for applying ribbed strips to insoles, a support for the insole, a presser foot for pressing the strip on the insole, means for feeding the insole, a flat knife lying in a vertical plane having portions of its cutting edge joining each other at an obtuse angle, said angle lying in the plane of the upper surface of the insole, and means for operating the knife to cause said angle to move in the plane of said surface to sever the strip.

17. In a machine for applying flanged ribbed strips to insoles, means for supporting the insole in a horizontal plane, means for feeding the insole, means for applying the ribbed strip to the insole, a knife blade disposed in a vertical plane with its cutting edge down, said edge having a nearly horizontal portion and a portion extending abruptly at an obtuse angle to the horizontal, and means for moving the knife transversely of the applied strip in a horizontal path whereby the upwardly extending portion of the knife edge severs the rib and the angle between the cutting edges severs the flanges of the strip.

18. In a machine for applying strips to insoles, a yieldingly supported table, a feed foot, means for positively operating the feed foot in a closed path, a passage through the feed foot for a ribbed strip, spring-actuated fingers in the feed foot for feeding the strip, and an oscillating cam for increasing the travel of the feed foot while out of contact with the work and restoring it to initial feeding position to draw more of the strip through the feed foot than is required to equal the feed movement imparted to the work.

19. In a machine for attaching strips to insoles, a yieldingly supported table, a feed foot having a guide for the strip, means for pressing the strip on the insole, means for imparting a four-motion movement to the feed foot, and an oscillating cam for momentarily increasing and then diminishing the length of the horizontal movement of the feed foot to cause the strip to be fed faster than the insole is fed.

20. In a machine for attaching strips to insoles, a yieldingly supported table, a four-motion feed foot, a lever containing a slide connected to the feed foot, a toggle and crank for operating the lever to lift the feed foot, a toggle and lever connected to the feed foot and to said crank for moving the feed foot horizontally, and means operated through the first-mentioned toggle for moving the slide during horizontal movement of the feed foot.

21. In a machine for attaching strips to insoles, a yieldingly supported table, a four-motion feed foot, a lever containing a slide connected to the feed foot, a toggle and crank for operating the lever to lift the feed foot, a toggle and lever connected to the feed foot and to said crank for moving the feed foot horizontally, and a cam for moving the slide during horizontal movement of the feed foot.

22. In a machine for applying strips to insoles, a yieldingly supported table, a feed foot, means for positively operating the feed foot in a closed path, a passage through the feed foot for a ribbed strip, spring-actuated fingers in the feed foot for feeding the strip, and an oscillating cam for momentarily increasing and then decreasing the travel of the feed foot while in the upper part of its travel to draw more of the strip through the feed foot.

23. In a machine for applying strips to insoles, power-operated means including a clutch for applying a strip to an insole, means for stopping the machine at a predetermined portion of its cycle, and power-operated means including a clutch for cutting off the strip, said second clutch being operable to sever the strip after the applying means has been stopped.

24. In a machine for applying flanged ribbed strips to insoles, means for supporting an insole, means for pressing the inner flange of the strip, said means having a component of movement toward the rib to apply pressure in the angle between the rib and the inner flange, a feed foot having a passage for the strip, means on the feed foot for advancing the strip, a single crank, and connections therefrom for operating the feed foot in a closed path.

25. In a machine for applying flanged ribbed strips to insoles, yielding means for supporting an insole, means positively and intermittently operated for pressing the inner flange of the strip, said means having a component of movement toward the rib to apply pressure in the angle between the rib and the inner flange, a feed foot having a passage for the strip, pawls on the feed foot for advancing the strip, and means for positively operating the feed foot in a closed path.

26. In a machine for applying flanged ribbed strips to insoles, a table, means for yieldingly supporting the table, a presser foot for engaging a flange of the strip, a feed foot having a passage for the strip, means carried by the feed foot for feeding the strip, and means for positively operating the feed foot in a closed path, the downward movement of the feed foot depressing the table to free the work from the presser foot and the upward movement of the feed foot causing the table to press the work against the presser foot.

27. In a machine for applying flanged ribbed strips to insoles, a table, means for yieldingly supporting the table, a presser foot for engaging a flange of the strip, a light spring for holding the presser foot toward the flange, means for limiting upward movement of the presser foot, a feed foot having a passage for the strip, means carried by the feed foot for feeding the strip, and means for positively operating the feed foot in a closed path, the downward movement of the feed foot depressing the table to free the work from the presser foot and the upward movement of the feed foot causing the table to press the work against the presser foot.

28. In a machine for applying ribbed strips to insoles, a rotary table, spring means for supporting the table, a feed foot having a passage for the strip, means on the feed foot for feeding the strip, and means for positively operating the feed foot in a closed path whereby the table is depressed during the downward movement of the feed foot.

29. In a machine for applying flanged ribbed strips to insoles, means for yieldingly supporting an insole, a feed foot having a passage for the strip, pawls carried by the feed foot for feeding the strip, means for positively operating the feed foot in a closed path to depress the table, feed the work and release the work, and a presser foot engaging the outer flange of the strip with light pressure during the feed and having a limited upward movement whereby the supporting means presses the work against the presser foot when the feed foot is lifted.

30. In a machine for applying flanged ribbed strips to insoles, means for yieldingly supporting an insole, a feed foot having a passage for the strip, pawls carried by the feed foot for feeding the strip, means for positively operating the feed foot in a closed path to depress the table, feed the work and release the work, a presser foot engaging the outer flange of the strip, a spring for applying light downward pressure to the presser foot during feed of the work, and a stop for limiting downward movement of the presser foot whereby the work may be released upon depression of the supporting means by the feed foot.

31. In a machine for applying flanged ribbed strips to insoles, a vertically movable table for supporting an insole, a spring sustaining the table, a feed foot having a passage for the strip, means carried by the feed foot for feeding the strip, means for positively operating the feed foot in a closed path to depress the table, feed the work and release the work, a presser foot engaging the outer flange of the strip, and a spring lighter than said table spring for pressing the foot upon the strip with light pressure during the feed and having a limited upward movement whereby the table applies pressure to the presser foot when the feed foot is lifted.

32. In a machine for applying flanged ribbed strips to insoles, means for feeding the strip, a presser foot engaging the outer flange of the strip and the outer face of the rib, said foot extending to and just over the top of the rib, and a tucking foot engaging the inner flange of the strip and cooperating with the presser foot to apply pressure in the angle between the inner flange and the rib.

33. In a machine for applying continuous strips to insoles, means for feeding a strip and insole, means for pressing the strip on the insole, an arm movable in a vertical plane, a presser foot on said arm for engaging the strip, a knife carried by the arm, and means for operating the knife to sever the strip.

34. In a machine for applying continuous strips to insoles, means for feeding the strip and insole, means for pressing the strip on the insole, an arm movable in a vertical plane, a presser foot on said arm for engaging the strip, a block carried by said arm, a cut-off knife mounted to reciprocate in said block, and means including an eccentric stud for adjusting the block relatively to the arm to vary the position of the knife edge with respect to the presser foot.

FREDERIC E. BERTRAND.

REFERENCES CITED

The following references are of record in the file of this patent:

UNITED STATES PATENTS

| Number | Name | Date |
|---|---|---|
| 603,763 | Hadaway | May 10, 1898 |
| 763,625 | Oakes | June 28, 1904 |
| 1,152,799 | Denne | Sept. 7, 1915 |
| 1,285,357 | Perry | Nov. 19, 1918 |
| 1,367,269 | Kime | Feb. 1, 1921 |
| 1,764,573 | Mueller | June 17, 1930 |
| 2,106,268 | Bertrand | Jan. 25, 1938 |
| 2,173,957 | Bertrand | Sept. 26, 1939 |
| 2,173,958 | Bertrand | Sept. 26, 1939 |
| 2,199,173 | Gruman | Apr. 30, 1940 |
| 2,326,119 | Bertrand | Aug. 10, 1943 |
| 2,383,560 | Paulsen | Aug. 28, 1945 |
| 2,442,647 | Fischbein | June 1, 1948 |

Certificate of Correction

Patent No. 2,573,683                                                    November 6, 1951

FREDERIC E. BERTRAND

It is hereby certified that error appears in the printed specification of the above numbered patent requiring correction as follows:

Column 12, line 37, for "block 56" read *block 556*; line 70, for "screws 60" read *screws 560*; column 15, line 37, strike out "rotating in a vertical plane" and insert the same in line 39, after "crank";

and that the said Letters Patent should be read as corrected above, so that the same may conform to the record of the case in the Patent Office.

Signed and sealed this 25th day of March, A. D. 1952.

[SEAL]

THOMAS F. MURPHY,
*Assistant Commissioner of Patents.*

Certificate of Correction

Patent No. 2,573,683                                                   November 6, 1951

FREDERIC E. BERTRAND

It is hereby certified that error appears in the printed specification of the above numbered patent requiring correction as follows:

Column 12, line 37, for "block 56" read *block 556*; line 70, for "screws 60" read *screws 560*; column 15, line 37, strike out "rotating in a vertical plane" and insert the same in line 39, after "crank";

and that the said Letters Patent should be read as corrected above, so that the same may conform to the record of the case in the Patent Office.

Signed and sealed this 25th day of March, A. D. 1952.

[SEAL]

THOMAS F. MURPHY,
                                                                *Assistant Commissioner of Patents.*